Patented Apr. 5, 1927.

1,623,858

UNITED STATES PATENT OFFICE.

PAUL JOSEF WOHL, OF FRANKFORT-ON-THE-MAIN, GERMANY.

TREATMENT OF GUT.

No Drawing. Application filed October 14, 1925, Serial No. 62,457, and in the Netherlands October 14, 1924.

It is a well-known fact that gut to be used for sausage-filling purposes should be as fresh and clean as possible. For this reason all fat therein contained must be removed, while the casings are carefully washed in water, then scraped and salted.

This work is taken care of in the abattoir, where there is rarely any further use for the gut. Working help for removing the fat and cleaning the gut is often very dear, while on the other hand the users of gut, for instances sausage manufacturers, often live in far away districts, or even countries, where cheap working help is available.

Furthermore, the habitual cleaning process does not hinder the gut from losing color, i. e. becoming grey or black by contact with air, thus developing fungus or germs.

The employment of such kind of gut is not permissible for sausage-filling purposes, but, on the other hand it has proved impossible to enforce such a law.

The invention hereafter described applies to a process for the preservation of gut so as to maintain its fresh state without fear of disease or loss of quality. Thus it is possible to transport uncleaned gut over long distances, and from one country to another.

According to the invention herewith presented, the gut is washed in the habitual manner in pure running water—this as soon as possible after killing of the animals has taken place, whereupon the casings are salted. They are then left to dry, and afterwards are packed with the fat side outwards in vessels provided with a tight-fitting cover having a top-hole (preferably with two holes therein). The casings are then pressed in a compact mass in the vessel, the lid fastened down, whereupon animal or vegetable fat, in melted condition, is poured into the vessel through the hole in the lid, until the vessel contains so much fat or lard that there are no empty spaces. After the fat has cooled off and consolidated the vessel is hermetically closed, and is ready for transport.

The drying of the washed and salted casings is effected by hanging them up or spreading them out. After they have been filled and pressed in the vessel, the latter can, if desirable, be left standing open for another night, so as to allow any possible moisture to evaporate. Preference is given to fat-, lard-, tierces or oil-barrels, because the penetration of said substances into the wood or other material of the barrels renders the latter more air-tight than new or ordinary vessels. The vessel is to be filled to the rim, then the gut pressed down tight and more of it added until it is brimful and overruns. Thereupon the lid is nailed down. If fat obtained from the casings themselves, or any other inferior quality, such as mutton-fat or the like is used, the same should be poured through a cloth or fine strainer before use. After the fat which has been poured in the vessel has become hard, some more melted fat is poured in so that even the smallest space is filled up.

It is a well-known fact that many substances and food-stuffs can be preserved by shutting them off from any contact with air, whether by layers of fat, or otherwise. However, up to the present, this method has not been employed for the preservation of uncleaned gut, making it possible to ship such gut from one country to another. It has up to the present never been discovered that something so easily inclined to putrefaction as gut could be preserved and maintained in the fresh state in such a simple manner, without the help of sterilizing, and without heat or cold. The gut prepared after this method has the good appearance and all desirable qualities of fresh gut, and thus is particularly adapted to the manufacture of sausages.

Besides, the new process offers important economical advantages.

For instance, sausage manufacturers are enabled to remove and use the fat contained in the casings. This not only means to them a saving, but also renders them certain of employing only such gut as complies with all necessary requirements.

Furthermore it is of importance that the fat obtained from the gut itself can be used for preserving purposes and therefore costs butchers, sausage manufacturers etc. nothing. Then again the fat obtained from the gut can be sent to the abattoir where the killing took place, to be used in preserving a further shipment of casings.

What I claim is:

1. A method of preserving uncleaned gut casings for shipping, comprising the steps of successively washing, salting and drying the casings; packing them in an air-tight vessel under pressure to form a compact mass in the vessel; fastening on the vessel a tight-fitting cover which is provided with an aperture; pouring melted neutral fat through said aperture into the vessel to completely fill all spaces therein; cooling and solidifying the fat; and finally hermetically sealing the vessel.

2. A method of preserving uncleaned gut casings for shipping, comprising the steps of packing the casings, after having been sterilized, in an air-tight vessel under pressure to form a compact mass therein; closing the vessel, after having been filled; introducing melted neutral fat into the closed vessel to completely fill all spaces therein; cooling and solidifying the fat; and finally hermetically sealing the vessel.

3. A preserving method, according to claim 2, in which the gut casings are packed in the vessel fat-side outward.

4. A method of preserving uncleaned gut casings for shipping, comprising the steps of successively washing, salting and drying the casings; packing them fat-side outward in an air-tight vessel under pressure to form a compact mass in the vessel; fastening on the vessel a tight-fitting cover which is provided with an aperture; pouring melted neutral fat through said aperture into the vessel to completely fill all spaces therein; cooling and solidifying the fat; and finally hermetically sealing the vessel.

In testimony whereof I affix my signature.

PAUL JOSEF WOHL.